United States Patent [19]

Maris

[11] Patent Number: 4,649,387

[45] Date of Patent: Mar. 10, 1987

[54] METHOD AND APPARATUS FOR INVESTIGATING AIRFLOW

[75] Inventor: John M. Maris, London, England

[73] Assignee: Marinvent Corporation, Toronto, Canada

[21] Appl. No.: 785,423

[22] Filed: Oct. 8, 1985

Related U.S. Application Data

[63] Continuation-in-part of Ser. No. 538,255, Oct. 3, 1983, Pat. No. 4,563,684, which is a continuation-in-part of Ser. No. 219,188, Dec. 22, 1980, Pat. No. 4,435,695.

[30] Foreign Application Priority Data

Dec. 24, 1979 [GB] United Kingdom ............... 7944397

[51] Int. Cl.⁴ .................................................. G08B 23/00
[52] U.S. Cl. ...................................... 340/966; 340/525; 73/147; 244/194; 324/65 R
[58] Field of Search ............... 340/966, 963, 606, 525; 364/426; 244/182, 191, 192, 194; 73/178 R, 178 T, 179, 147, 204; 324/65 R

[56] References Cited

U.S. PATENT DOCUMENTS

| | | | |
|---|---|---|---|
| 2,431,241 | 11/1947 | Godsey | 340/966 |
| 2,596,116 | 5/1952 | Bamber | 340/966 |
| 2,603,695 | 7/1952 | Campbell | 340/966 |
| 2,638,579 | 5/1953 | Dyche et al. | 340/966 |
| 2,748,372 | 5/1956 | Bunds, Jr. | 340/966 |
| 3,079,105 | 2/1963 | Raspet | 340/966 |
| 3,426,322 | 2/1969 | Balo | 340/966 |
| 3,868,625 | 2/1975 | Speigner et al. | 340/966 |
| 4,229,725 | 10/1980 | Keilly | 340/966 |

OTHER PUBLICATIONS

"Aerospace America" Jun. 1985, pp. 42, 43.

Primary Examiner—Donnie L. Crosland
Attorney, Agent, or Firm—Jordan and Hamburg

[57] ABSTRACT

The airspeed over an external surface of the aircraft is sensed at a predetermined location spaced from the surface, signals are produced representative of average airspeed and of airspeed fluctuations caused by air turbulence, and the signals are also used to produce a signal representative of the ratio of the airspeed fluctuations to the average airspeed.

2 Claims, 8 Drawing Figures

METHOD AND APPARATUS FOR INVESTIGATING AIRFLOW

BACKGROUND OF THE INVENTION

This application is a continuation-in-part of U.S. Ser. No. 538,255 filed Oct. 3, 1983, now U.S. Pat. No. 4,563,684 which in turn was a continuation-in-part of U.S. Ser. No. 219,188, filed Dec. 22, 1980, now issued as U.S. Pat. No. 4,435,695.

The present invention relates to a method of and apparatus for investigating the airflow over any external surface of an aircraft. More generally, the airflow over any external surface of any verhicle, such as a motor car or other road vehicle, could be investigated.

My new investigatory method and apparatus were developed from as stall warning system. An artificial stall warning device is almost universally fitted to transport aircraft. The role of the equipment is to augment, or substitute for, the natural stall symptons, which may vary according to the aircraft configuration, weight, attitude, and the manoeuvre being performed. Surprisingly complex aircraft often have to rely on basic stall detection devices. These fall generally into two groups:
1. Those actuated by a hinged vane mounted on the leading edge of the wing, sensitive to the position of the stagnation point of the airflow.
2. The more sophisticated angle-of-attack systems.

The wing leading edge device senses the movement of the stagnation point as it transitions from above the vane to below it, as the stall is approached. Inherent in such a system are several disadvantages:

1. The vane is very prone to interference from gusts, and, in addition, is badly affected by transient g-loadings that arise in turbulence.

The resulting nuisance warnings are most pronounced at low speeds (where a given gust velocity is a greater percentage of the aircraft speed, and the inertia of the machine is low, which compounds the g-loading problem). Because of this, the system is most likely to be ignored just when it is most needed during take-off and landing. At best, the spurious warnings are distracting at a critical time.

2. A problem arises because of the limited number of vanes that are fitted to the aerofoil. Having just one or two sensors is undesirable because only a small part of the airflow is sampled. In fact, a second vane is often required because a single unit cannot cope with changes of aircraft configuration (the lowering of flap, for example). This serves to highlight the inherent inflexibility of such a system.

3. Another serious problem relates to flight through icing conditions, which may alter the performance of the device in several ways, even if the vane itself is heated. When an aerofoil ices up, its profile is altered. The result may be that the stalling incidence (angle-of-attack) is reduced. The van is then referenced to the wrong stalling angle, so that no warning may be provided even though the wing may have stalled. A similar situation arises for different reasons due to the locally disturbed flow at the wing leading edge. Flow distortion influences the position of the stagnation point so that the system again becomes inaccurate. Heavy rainfall, frost, airfoil contamination and airframe damage can cause effects similar to icing.

4. There is a further problem during take-off. While the aircraft is on the ground, the incidence is basically dictated by the geometry of the aircraft. Until the nose of the aircraft is raised (termed "rotation"), an angle-of-attack sensor cannot operate. If a wing is iced up, takeoff may be possible due to the ground effect, but no stall warning would be given until too late - it is procedurally incorrect to abort once rotation has started.

These last three problems arise because the sensor is calibrated for only one given situation. The system response does not adapt to altering circumstances, and indeed it cannot. It is not what might be called an 'intrinsic' stall warning device. The position of the stagnation point may or may not give valid information about the stall.

Even the angle-of-attack sensor is open to similar criticism. Although local flow disruption influences the system less, it is nevertheless unable to sense a change of situation and respond accordingly.

U.S. Pat. No. 4,435,695 discloses a stall warning system based on determining the ratio of the airspeed fluctuations to the average airspeed at a location spaced above the wing. The apparatus could be arranged as a continuous display or continuous reading instrument, displaying progressively on a meter how close the wing section is to stalling, e.g. as a ratio or percentage of the turbulence intensity to the threshold value. The safety margin (threshold value) could be selected at will.

The present invention seeks to provide an investigatory tool which is dependent on an inherent characteristic of the airflow, particularly as a stall is approached.

THE INVENTION

The present invention provides a method and apparatus for investigating the airflow over an external surface of an aircraft, in which the airspeed over the wing is sensed at a predetermined location spaced above the top surface of the wing to produce input signals representative of airspeed fluctuations at said location, which fluctuations are caused by air turbulence over the wing, and the input signals are used to indicate airspeed fluctuations, average airspeed and the ratio of the airspeed fluctuations to the average airspeed - this ratio is referred to as "R" herein.

The invention can be used as a research or predictive tool for determining or analysing the airflow over any external surface of an aircraft, for in-flight testing; the instrument can be used to measure airflow or turbulence intensity. The sensing means can be attached to any suitable surface. In a general sense, a single sensing means could be moved from one location to another after a test run, but preferably a relatively large number, say twenty or thirty, of sensing means could be used at once, say connected to a single computer for analysing and evaluating the results.

EXPERIMENTS AND PRACTICAL EMBODIMENTS

Experiments were carried out to establish the feasibility of the invention, and practical embodiments have been devised. The experiments are described in my U.S. Pat. No. 4,435,695, the disclosure of which is incorporated herein by reference. The practical embodiments are described below, by way of example, with reference to the accompanying drawings, in which.

In the experiments, a hot-wire probe was used. In a hot-wire probe, a current is passed through wire; the temperature of the wire is maintained automatically at a constant value, normally of several hundred degrees centigrade; the varying current required to do this is sensed, giving instantaneous input signals of airspeed or velocity. Thus the probe senses speed or speed fluctuations directly and does not sense pressure. Normally, hot-wire probes have a very high frequency response and are capable of measuring the variations in airspeed that occur in air turbulence - it is believed that fluctuations of up to 50,000 Hz or more can be measured in a practical embodiment.

The experiments demonstrated that the method is feasible. The experiments showed that the turbulence intensity can be continuously sensed and displayed if desired. The fact that many of the results arrived at were in a non-dimensional form indicates that the results obtained on a small scale, as in the above described experiments, should be applicable to full scale aircraft wings. Naturally, this would require suitable calibration, and not all the instruments used in the experiments would be suitable for a full scale stall warning device. For example, the hot-wire probe used in the experiments is much too fragile in its present form to be used in full scale applications, but a more robust version of the hot-wire probe would be suitable for installation on a full scale aircraft wing. A suitable probe is a temperature-compensated quartz-covered wedge, conical or hemispherical type hot-film probe with surface toughening; only the first few thousandths of an inch of the front of the probe are sensitive, and thus, there is no significant auto-generated turbulence. If the probe is bathed in water, it can be made to compensate as both the root-mean-square (RMS) velocity fluctuations and the time average velocity values are altered. As the probe sensitive part is hot, icing need not be a prblem. Alternative sensors are for instance a microphone or a laser-Doppler sensor or a solid-state pressure sensor.

For stall warning on full size aerofoils, it is believed desirable to mount the probe above the aerofoil and aft of the 50% chord position, preferred positions being from around the 50% to around the 75% or 85% positions, the precise position (e.g. around the 66% position) varying from aircraft to aircraft. It is in general preferable to mount the probe above the normal boundary layer, where it will be directly exposed to the free airstream over the wing section (the airstream is termed "free" although it will have been affected by the flow of air over the wing section, it being free in the sense that it is not affected by the boundary layer itself).

FIRST PRACTICAL EMBODIMENT

Figure 1:
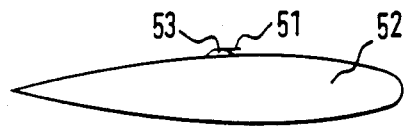
FIG. 1 is an end view of an aircraft wing, on which is mounted a probe of the invention.

FIG. 1 shows a temperature-compensated hemispherical hot-film quartz-coated probe 51, with surface toughening, mounted on an aircraft wing 52 using a conventional mount 53; in practice, as explained below, there will be two or three spanwise-spaced probes 51. For stall warning, the tip of each probe 51 is preferably aft of the 50% chord position, e.g. at the 66% chord position which has been experimentally tested. For investigating airflow, the probe 51 can be anywhere on any external surface of the aircraft. Each probe 51 is a 1338 probe mounted on a 1150-6 probe support 54 (FIG. 2) and connected to a 1750 constant temperature anemometer bridge circuit (measuring bridge) 55, these designations being the designations of the supplier Thermo-Systems Inc. (TSI) of St. Paul, Minneapolis, U.S.A. The probe 51 incorporates a temperature compensating winding or resistor in the tube immediately behind the thin leading rod. Each measuring bridge 55 is connected to a cockpit or flight-deck front panel box 56 which contains a computer.

In general terms, the signal obtained by the measuring bridge 55 is composed of a DC component (about 5 volts) with a superimposed 'ripple' or a AC component (about 1% of the DC component). These correspond to the average airflow velocity and turbulence level respectively. The signals are separated (by a capacitor, for example) within the computer, and then converted from analog to digital form by an analog-to-digital converter. These digital representations of the airflow conditions are then processed further within the computer unit.

Specifically, the signals are converted to feet-per-second equivalents, because the output voltages from the measuring bridge 55 are not linear functions of airflow velocity. This conversion currently uses a fourth-order polynomial to translate volts into feet-per-second. Higher or lower orders could be used depending on the accuracy required. Because of these non-linearities, the AC signal differentiated with respect to voltage in order to maintain its correct relationship with the DC component. More generally, a fourth-order polynomial is applied to the output DC voltage to linearise it with airspeed and a third-order polynomial is applied to the output AC voltage to linearise it with airspeed fluctuations and ensure that the DC and AC components are equally scaled.

Finally, the ratio (R) of root-mean-square (RMS) feet-per-second AC to feet-per-second DC is computed. This ratio is the "turbulence intensity" and is in other words the ratio of the RMS local time airspeed fluctuations to mean local true airspeed. The critical value of R can be experimentally established in flight, and this value adopted as the threshold for stall warning under all circumstances. Depending on the aircraft, a different (lower) value of R or a profile of R against true airspeed may be desirable to give a warning anticipating stall conditions when the aircraft is still on the ground, during take-off. An undercarriage-mounted pressure switch (schematically represented as 59 in FIG. 7) is a simple means of switching between the on-ground and in-flight modes. In general, the on-ground and in-flight modes can be applied to the operation stall warning system of my pending U.S. Ser. No. 538,255 or of my U.S. Pat. No. 4,435,695.

As the embodiment can serve as a proper stall warning system or as an investigatory system, the stall warning system is first described. The logic part of the computer examines the turbulence intensity and mean (DC) flow speed. If the mean speed is below a pre-stored threshold (lower cut-off speed), the computer output is suppressed. This precludes extraneous indications when an aircraft is moving slowly on the ground. Above this cut-off threshold, the computer generates an output proportional to the measured turbulence intensity. The computer can include the switching facility 59 between the on-ground and in-flight modes, referred to above, The computer output consists of a conventional four-digit seven-segment numerical display 57 (see 174-177 described below) of the turbulence intensity, as a percentage, which is used e.g. for calibrating, measurement taking or fault finding, and is switched off for normal flight. There is also a light-emitting-diode (LED) bar graph display 58 (see 184, 185 and 194 described below), which illuminates a variable number of LED bars corresponding to the turbulence intensity. When the mean speed is above the threshold, the display 58 automatically lights up. The aircraft will still be accelerating on the ground, and the incidence is basically dictated by the geometry of the aircraft. However if say three bars light up, conditions may be difficult and if say five bars light up, there is too much turbulence, for instance due to icing on the wing. Thus, because turbulence and not incidence is being sensed, indications can be given before rotation. In normal flight and on approach, half the bars for example should be lit up, and the left-hand half can be orange and the right-hand half red. Standard outputs are also available to drive conventional flight instrument displays, pointers, meters, lights and so on, as required. Should the turbulence intensity exceed a preset value, then a warning condition arises, which can be made to activate buzzers, lights, stick-shakers, stick-pushers or any other peripheral, identifying an imminent stall. In addition the LED-bar scale starts to flash. The computer has ample capacity for expansion, and has a response rate faster than the eye can follow i.e. when the signals change rapidly, the digits and display bars show no perceptible lags in indicating the new values.

So that it can serve as a measuring tool for aerodynamic purposes, the prototype computer is more sophisticated than an ordinary stall-warning system would need to be. Its refinements include the following:

- It has the capability to monitor multiple probes (e.g. up to six), sequentially. Many spanwise-spaced locations on the wing could thus be continuously monitored. In practice only one wing need be sampled, and two or three spanwise-spaced probes are sufficient; the probes are able to monitor the flow when flaps are lowered.
- It can accept any DC/AC signal, regardless of its source.
- It has two preset trigger levels - one for "alarm" the other for "warning" purposes. They can cause different responses as required.
- It incorporates full self-test capabilities to test all computational circuitry.
- Warning levels, calibration factors, low-speed cut-off values and all flow-parameters can be displayed and altered instantly from the face of the unit, without dis-assembly.
- A rate-term is included which can provide earlier warning if a stall condition is being approached rapidly.
- The probe system is temperature compensated, to balance unwanted thermal effects.
- Data signals can be outputted to peripheral devices, such as a data-link unit for real-time airflow measurement transmission to ground stations.

Many of these features would be unnecessary on production units which would be designed for specific stall warning applications and hence would not need some of the flexibility of the prototype.

Figure 3:
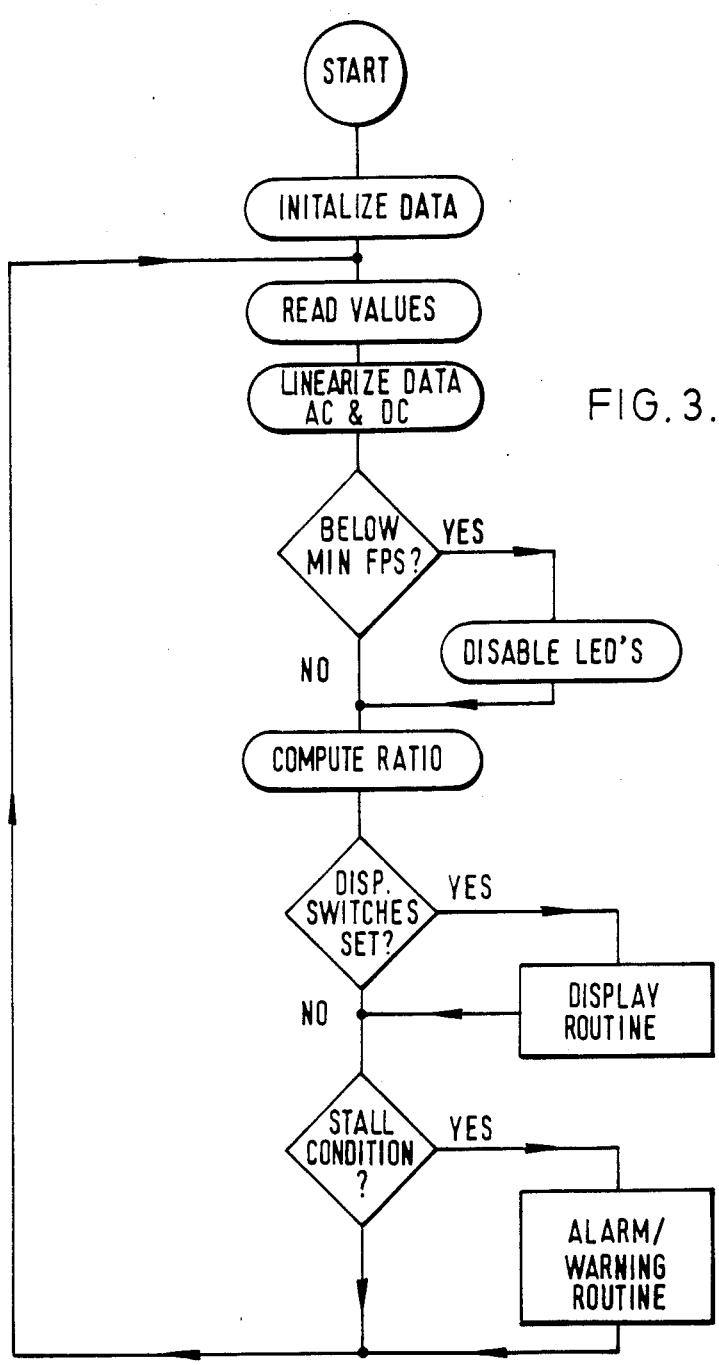
FIG. 3 is a simplified computer flow-chart for the invention.
Figure 4:
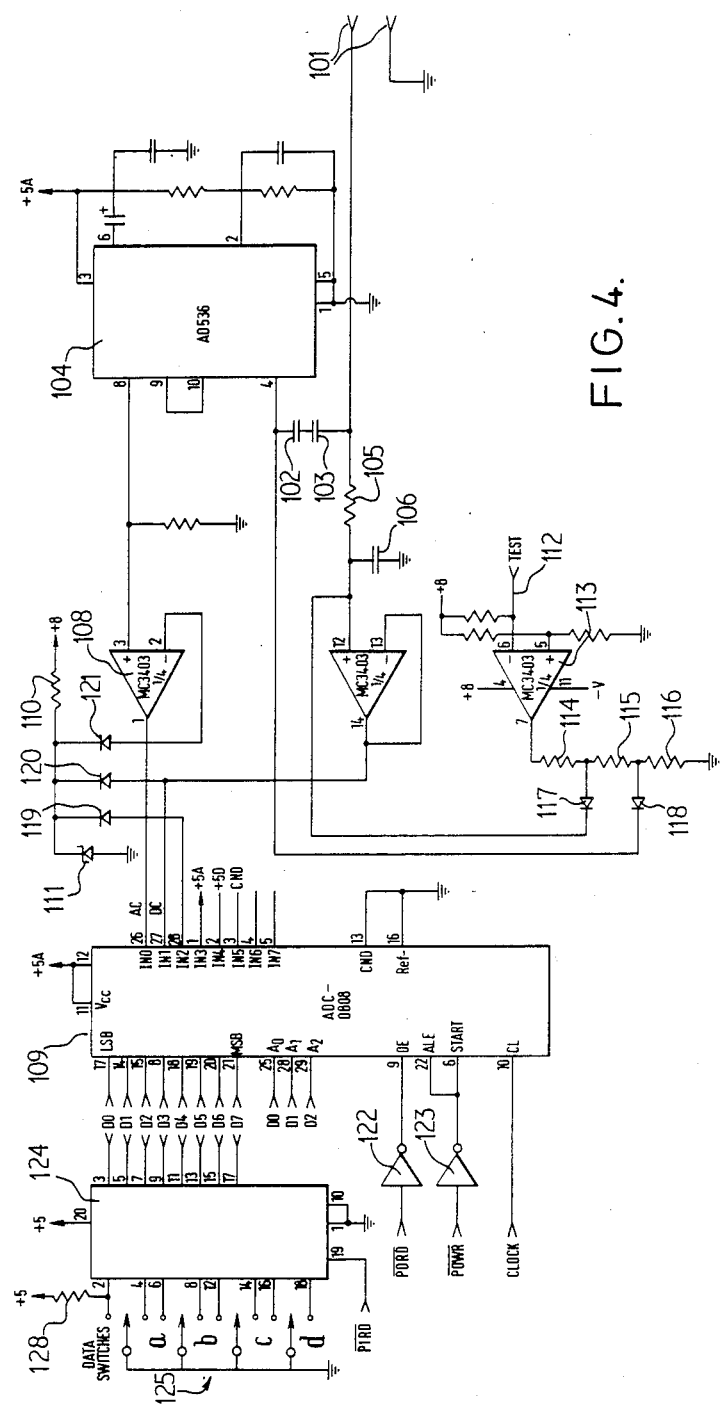
FIGS. 4, 5 and 6 are circuit diagrams for the computer in the practical embodiment.
Figure 5:
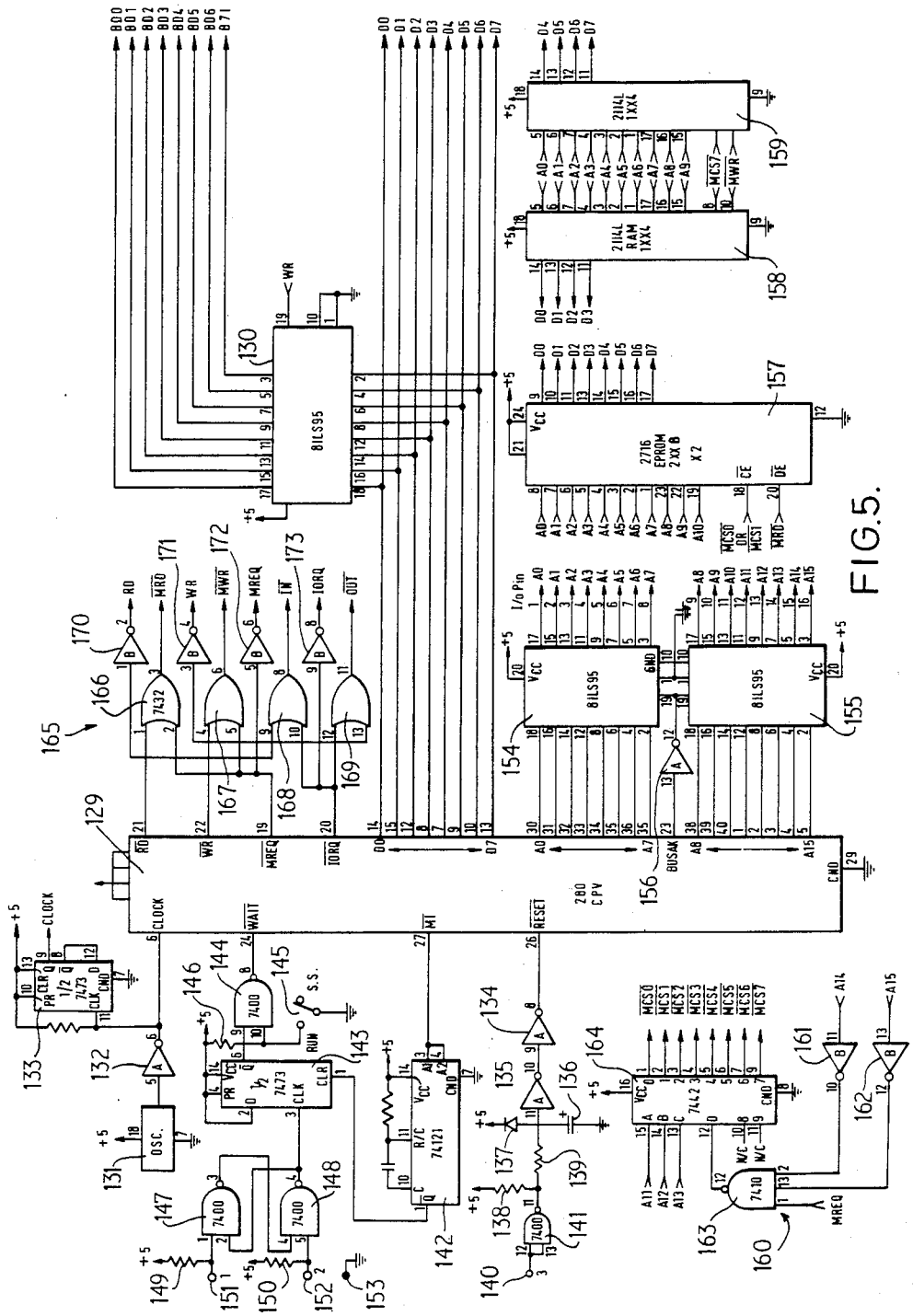
Figure 6:
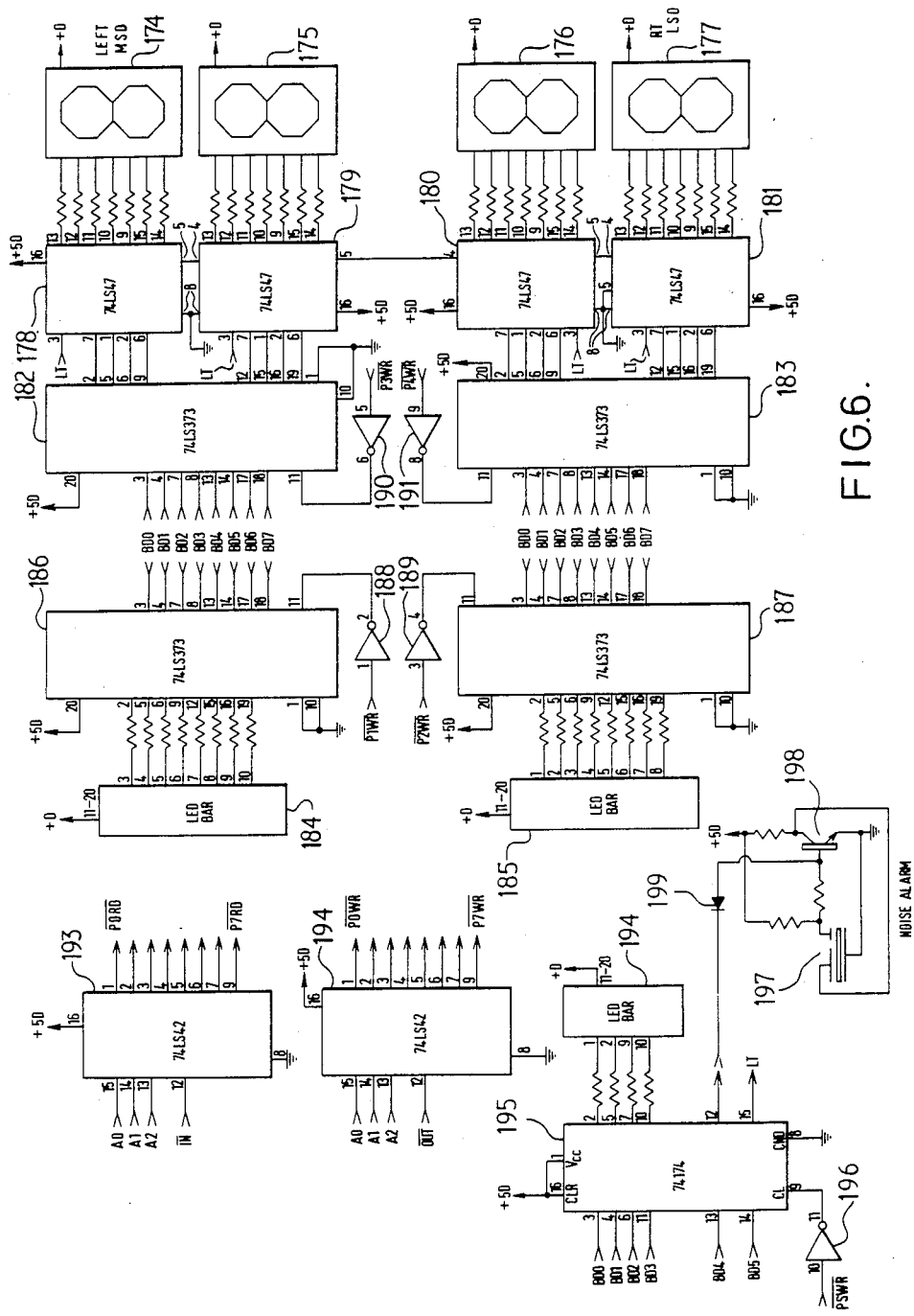

FIG. 3 gives a simplified computer flow-chart, a detailed description of the computer being given below in relation to FIGS. 4 to 6.

The circuit diagram shows the parts of the apparatus to which the measuring bridge is connected. The various integrated circuits are designated with the standard type number and the pin numbers have also been given. Various signal lines have also been referred to by the standard designations. These type numbers and standard designations are well known to the man skilled in the art.

The apparatus has a main circuit board containing a power supply (switchable 12 or 24 volt) an the analog circuitry. Plugged into this board are two sub-boards containing the digital circuits, and a display board.

The measuring bridge is connected to input terminals 101 and thence via capacitors 102 and 103 to the input of an integrated circuit 104 which, together with the associated resistors and capacitors, comprises an AC-to-RMS converter. The input terminals are also connected via a low pass filter comprising a resistor 105 and a capacitor 106 to an operational amplifier 107 connected as a voltage follower. The output of the integrated circuit 104 is similarly connected to an operational amplifier 108 connected as a voltage follower. The outputs of the operational amplifiers 107 and 108 are connected to respective inputs of a multiplexing analog-to-digital converter integrated circuit 109. A further input of the integrated circuit 109 is connected to a voltage reference source comprising a resistor 110 and a zener diode 111. Further inputs of the integrated circuit 109 are connected to ground and to power supply rails.

A test switch (not shown in FIGS. 4-6 - see FIG. 2) is connected to an input 112 of an operation amplifier 113 which, together with is associated resistors, comprises a comparator. The output of the comparator is connected to ground via a potential divider comprising resistors 114, 115 and 116. The tapping points of the potential divider are connected via diodes 117 and 118 to the inputs of the integrated circuit 104 and the operational amplifier 107 so as to supply predetermined voltages thereto when the terminal 112 is earthed via the test switch. The predetermined voltages are such as to simulate an alarm condition so as to allow operation of the apparatus to be tested.

The digital outputs and address inputs of the integrated circuit 109 are connected to data and address buses. Positive excursions of the input terminals of the integrated circuit 108 are limited by means of diodes 119, 120, and 121 connected to the reference voltage source. The integrated circuit 109 is connected to two inverters 122 and 123 which receive control signals from the microprocessor described hereinafter.

An integrated circuit tri-state octal buffer 124 has outputs connected to the data bus and inputs connected to four change-over data switches 125a-d provided with pull-up resistors 128 (only one shown). The functions of the switches 125 will be further described hereinafter.

A Zilog Z80 microprocessor 129 is connected to the data bus and, via an integrated circuit tri-state octal fubber 130, to display output lines BDO-BD6 and B71. An oscillator 131 supplies clock pulses via an inverter 132 to the microprocessor 129 and via a divide-by-two circuit 133 to the converter integrated circuit 109.

A reset input of the microprocessor 129 is connected via inverters 134 and 135 and to a reset circuit comprising a capacitor 136, a diode 137, and resistors 138 and 139 for initialising the microprocessor when power is applied to the apparatus. A reset switch (not shown in FIGS. 4–6 - see FIG. 2) connected to a terminal 140 is also connected via a buffer 141 to the reset circuit so as to permit manual resetting of the apparatus.

The output MI of the microprocessor is connected to an integrated circuit 142 which, together with the associated resistor and capacitor, comprises a monostable mulivibrator whose output is connected to the clear input of a latch 143. The output of the latch is connected to an input of a NAND gate 144 whose output is connected to a WAIT input of the microprocessor 129. A switch 145 is connected, together with associated pull-up resistor 146 to the other input of the gate 144 and allows selection of the run mode or stop mode of the apparatus. The clock input of the latch 143 is connected to the output of a flip-flop comprising NAND gates 147 and 148. The flip-flop, together with the pull-up resistors 149 and 150 provides de-bouncing for a switch (now shown in FIGS. 4–6 - see FIG. 2) connected to the terminals 151 to 153. This part of the circuit is provided for diagnostic functions only and will not be described further.

The address outputs of the microprocessor 129 are connected via integrated circuit tri-state octal buffers 154 and 155 to the address bus of the apparatus. A select signal is supplied via an inverter 156 to control inputs of the buffers 154 and 155. The microprocessor is provided with a read only memory integrated circuit 157 (in practice 2K 8-bit PROM's) for storing the operating program and with random access memory integrated circuits 158 and 159 (each 1K). Address lines A11 to A15 are connected to a chip-select circuit 160, whose outputs are connected to chip-select lines MCS0 to MCS7. The circuit 160 comprises inverters 161 and 162, a NAND gate 163, and a BCD-to-decade converter integrated circuit 164.

Control outputs of the microprocessor 129 are connected to a circuit arrangement 165 for providing control signals to other parts of the apparatus. The circuit arrangement 165 comprises four OR gates 166 to 169 and four inverters 170 to 173.

The apparatus includes four Hewlett-Packard seven-segmented displays 174 to 177 whose segments are connected via current-limiting resistors to the outputs of four BCD-to-7-segment converter integrated circuits 178 to 181. The inputs of the converters 178 to 181 are connected to two octal latch integrated circuits 182 and 183.

Two Hewlett-Packard light emitting diode bar displays 184 and 185 are connected via current-limiting resistors to two further octal latch integrated circuits 186 and 187. Multiplexing and selection of the displays is performed by means of inverters 188 to 191 and BCD-to-decade converter integrated circuits 192 and 193.

A further Hewlett-Packard light emitting diode bar display 194 is connected to a latch integrated circuit 195 which receives clock signals via an inverter 196. The latch 195 also controls, via a diode 199, a piezo-electric buzzer 197 for providing an audible warning. The buzzer forms part of an oscillator comprising a transistor 198 and associated resistors.

The functions of the four data switches 125a–d and of the various displays will now be described. The first data switch 125a has two positions FPS and FSD. The second data switch 125b has two positions ALM AND WRN. The third data switch 125c has two positions FAC and R. These three switches are each biassed to a centre position in which contact is made. The fourth switch 125d has a first position FDC and a second position to which it is normally biassed.

When the third switch is moved to its position FAC with none of the other data switches actuated, the four seven-segment displays indicate the turbulence in feet per second. When the third switch is moved to its position R and none of the other data switches is operated, the four seven-segment displays indicate the ratio of turbulence to airspeed, which is derived from the ratio of the RMS signal to the DC signal from the measuring bridge. When the fourth data switch is moved to its position FDC with none of the other data switches operated, the four seven-segment displays indicate the airspeed in feed per second.

When the first data switch is moved to its position FPS, the lower cut-off speed, below which the apparatus does not respond so as to prevent incorrect warning during taxiing of an aircraft, may be set by operation of the third and fourth switches to the positions FAC and FDC for setting the "tens" and "units" of the cut-off speed, which is simultaneously displayed by the four seven-segment displays. When the first data switch is in its position FSD, operation of the third and fourth switches allows the scale factor of the LED bar display to be adjusted, the scale factor also being displayed on the four seven-segment displays. The LED bar display provides an "analog" display of the ratio of turbulence of airflow.

When the second data switch is in its position ALM, the threshold value of the ratio of turbulence to airspeed at which an audible alarm provided by the piezo-electric buzzer 197 is provided may be set by means of a third and fourth data switches as described above, with the threshold value being displayed on the four seven-segment displays. The second data switch is in its position WRN, the threshold of the ratio of turbulence to airspeed at which the outer bars of the LED bar display flash may be set by the third and fourth data switches with the threshold being indicated by the four seven-segment displays, as described above.

SECOND PRACTICAL EMBODIMENT

Figure 2:
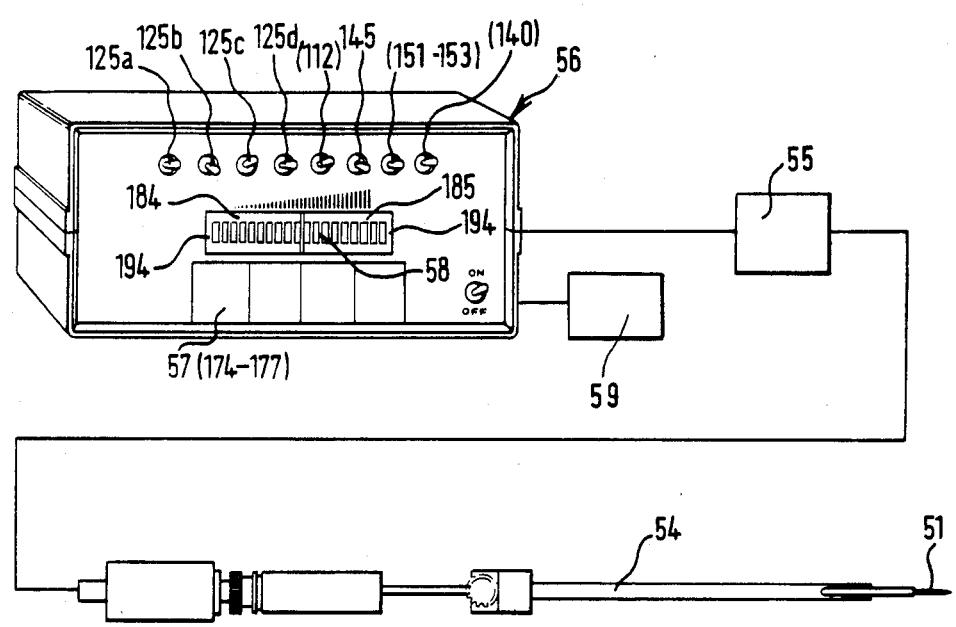
FIG. 2 is a schematic view of a practical embodiment of the invention.
Figure 7:
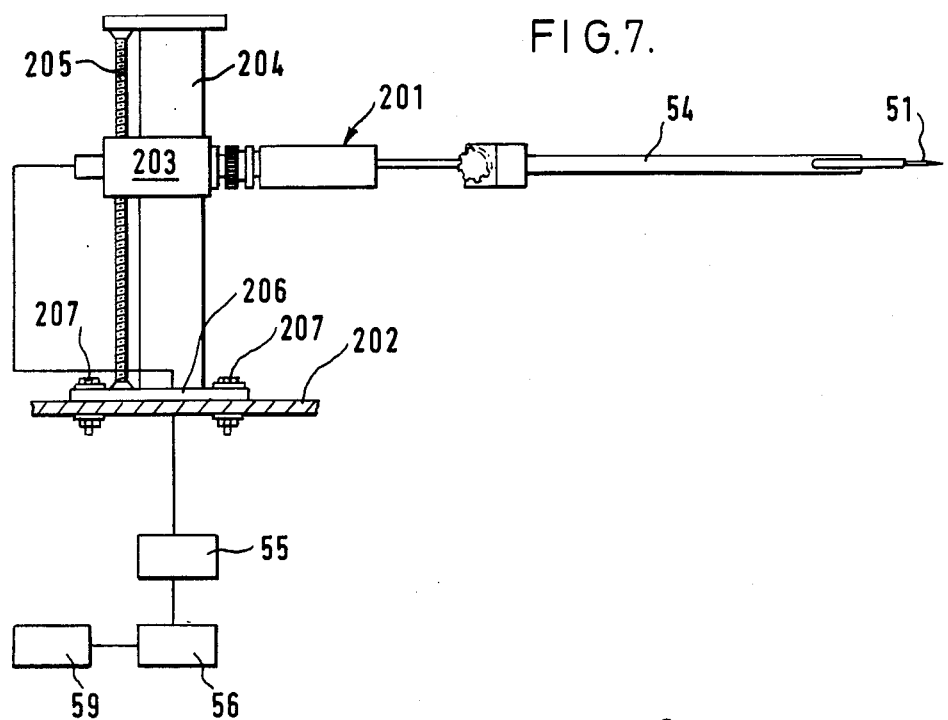
FIG. 7 is a schematic view of a second practical embodiment, illustrating a variant of the invention.

FIG. 7 shows a research probe arrangement 201 for bolting to an external surface 202 of an aircraft, which surface is exposed to the airflow over the aircraft. The arrangement is generally as shown in FIG. 2, and the same references are used for the same or similar parts. However, the support 54 is carried by a carrier 203 which slides on a bar 204 and can be moved up and down by a manually or remotely rotatable screwjack 205, which also locates the carrier 203 in position. The bar 204 is mounted on a plate 206 which is provided with conventional bolts, etc 207 for bolting to the surface 202.

As already explained above in relation to the computer, a panel box 56 can be arranged to display airspeed (fourth data switch) or the ratio R of turbulence to air speed (third data switch), i.e. turbulence intensity. Special switching arrangements can be provided for connecting in any suitable number of further probes.

The ratio of the airspeed fluctuations to the average air speed may be a strictly linear ratio, but this is not essential. For instance, the rate-term means referred to above may be included so as to change the ratio if a predetermined turbulence threshold is rapidly approached. In addition, the actual function chosen for determining the ratio need not be linear-for instance a logarithmic function could be used.

Figure 8:
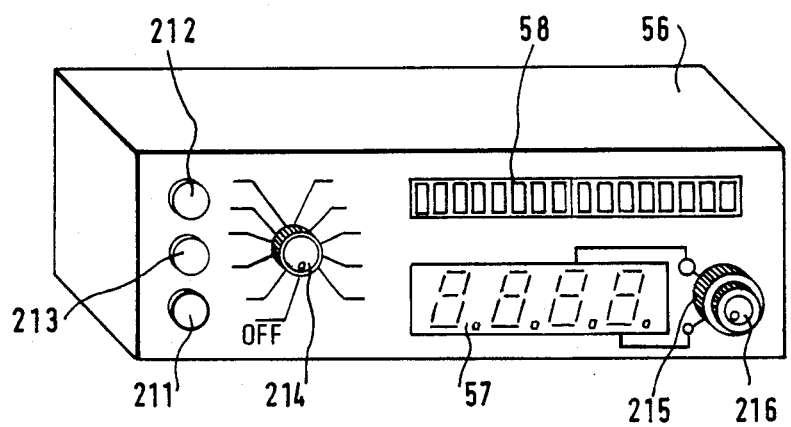
FIG. 8 illustrates an alternative front panel box, for the embodiment of FIG. 7.

The cockpit or flight-deck front panel box 56 shown in FIG. 8 carries out functions very similar to those of the box 56 shown in FIG. 2, and similar items have the same references.

The box 56 has the four-digit display 57 and the bar graph display 58, which can be of sixteen segments. There are power, stall warning and take-off abort lights 211, 212 and 213. The abort light 213 illuminates only on the ground and only when the take-off abort criteria have been met.

The numeric display 57 is used for calibrating the unit to a specific aircraft and also for taking airflow measurements; a main function rotary switch 214 and two concentric rotary switches 215,216 control these functions. The main function rotary switch 214 has twelve positions with five display options on the left hemisphere, five calibration positions on the right hemisphere and an on/off function, one position being unused. The display positions are generally used when the system is in operation, to gather aerodynamic data, and are generally as described in relation to the four data switches 125a-d of FIGS. 4–6, the positions indicating the DC voltage, AC voltage, local true airspeed in feet per second, turbulence component in feet per second, and R value. The calibration positions adjust the unit for operation as a stall detection and warning system, and enable the various constants to be entered. The calibration constants and (and corresponding positions) are the two warning levels of R (in-flight and on-ground), the scale factors for the bar graph and the cut-in speed of the unit. The concentric selectors 215, 216 are used to enter these values into the numeric display 57, for storage. However, the calibration curves for the probe 51 are stored in internal memory chips and cannot be altered from outside the unit. Display dimming can be accomplished by a push-pull action of the smaller knob 216. As the function switch 214 is selected from off to any of the display positions, the computer performs an automatic internal self-test routine and illuminates all the displays. The unit is then operational and the numeric display 57 indicates the selected value.

I claim:
1. Apparatus for investigating the airflow over an external surface of an aircraft, comprising:
   means for sensing air speed over the surface at a predetermined location spaced from the surface to thereby produce input signals representative of the average airspeed at said location and of air speed fluctuations at said location, said fluctuations being caused by air turbulence at said location;
   means for using said input signals to produce the signal representative of the ratio of said air speed fluctuations to said average air speed;
   means for using said signals to produce a signal representative of said average air speed;
   means for using said input signals to produce a signal representative of said air speed fluctuations; and
   indicating means for indicating said ratio, said air speed fluctuations and said average air speed.

2. A method of investigating the airflow over external surfaces of an aircraft, comprising sensing air speed over the surface at a predetermined location spaced from the surface to thereby produce input signals representative of the average airspeed at said location and of airspeed fluctuations at said location, said fluctuations being caused by air turbulence over said surface, using said signals to produce signals representative of said average air speed, of said air speed fluctuations and of the ratio of said air speed fluctuations to said average air speed, and indicating at least one of said average air speed, said air speed fluctuations or said ratio.

* * * * *